W. H. JOHNSON, A. L. BIRD & C. E. CONNELL.
CUTTER FOR PHOTOGRAPHIC PRINTS AND OTHER SHEET MATERIALS.
APPLICATION FILED MAR. 9, 1914.
1,161,773. Patented Nov. 23, 1915.
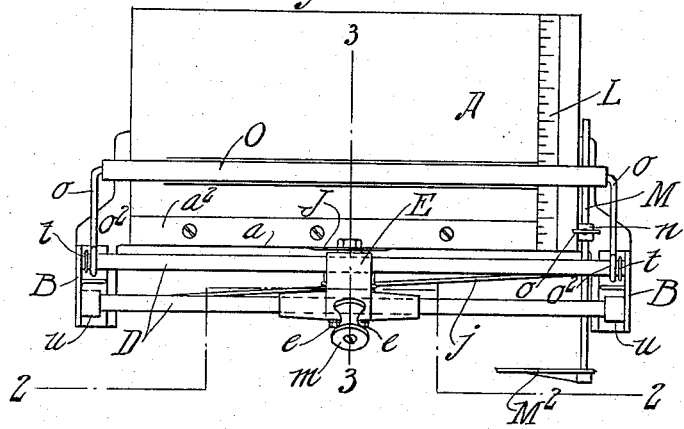
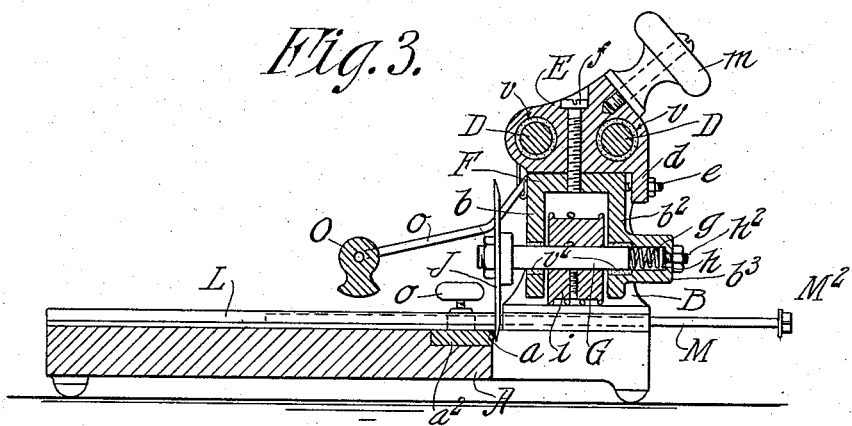
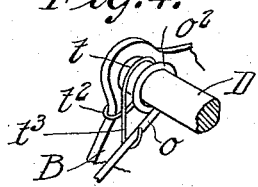
WITNESSES:
W. P. Noble
G. R. Driscoll
INVENTORS
W. H. Johnson,
A. L. Bird, and
C. E. Connell.
BY
ATTORNEY.

UNITED STATES PATENT OFFICE.

WILLIAM H. JOHNSON, ARTHUR L. BIRD, AND CHARLES E. CONNELL, OF BRANDON, VERMONT, ASSIGNORS TO BICOJON MANUFACTURING COMPANY, A CORPORATION OF VERMONT.

CUTTER FOR PHOTOGRAPHIC PRINTS AND OTHER SHEET MATERIALS.

1,161,773.  Specification of Letters Patent.  Patented Nov. 23, 1915.

Application filed March 9, 1914. Serial No. 823,478.

*To all whom it may concern:*

Be it known that we, WILLIAM H. JOHNSON, ARTHUR L. BIRD, and CHARLES E. CONNELL, citizens of the United States of America, and residents of Brandon, in the county of Rutland and State of Vermont, have invented certain new and useful Improvements in Cutters for Photographic Prints and other Sheet Materials, of which the following is a full, clear, and exact description.

This invention relates to a machine, designed to be manually operated, especially for the trimming of photo prints, but susceptible of employment for the trimming of other sheet material.

One of the objects of the invention is to provide a cutter or trimmer in which the carrier for the rotative cutter is so slidably supported that it is incapable of any deflection from the line of its movement whereby the trimming action of the disk cutter or slitter will be impaired.

Another object is to provide means whereby the cutter disk may be held at all times yieldingly against the edge of the sheet material support with which it coacts for the shearing or cutting action.

Another object of the invention is to provide means whereby the tension or force with which the cutter disk is held against the cutting edge of the base may be regulated.

Another object is to provide means whereby the part of the carrier in which the cutter shaft is journaled may be positioned so that the cutter disk may have its rotation at the cutting edge of the base in a plane slightly angular to the top surface of the base.

Another object is to provide simple and improved means for causing, under the bodily movement of the carrier along the runner bars therefor, the rotary movement of the cutter disk, provision here being made for keeping the rotation imparting means under spring tension for the best operation thereof.

Another object is to provide an improved form of clamp for holding the photo prints or other sheet material firmly on the base while the same are being trimmed.

Another object of the invention is to provide an adjustable gage whereby portions of the prints or sheets of any width may be accurately cut.

Other objects of the invention are to generally simplify and improve the structural character of the machine to conduce to the durability of the same and to insure the most desirable and satisfactory operations thereof.

The invention is described in conjunction with the accompanying drawings and is set forth in the claims.

In the drawings:—Figure 1 is a plan view of the improved trimmer. Fig. 2 is a rear elevation with parts in vertical section all as seen along the line 2—2, Fig. 1. Fig. 3 is a vertical cross section, on a larger scale, on line 3—3, Fig. 1. Fig. 4 is a perspective view showing in detail a device to be hereinafter referred to.

Similar characters of reference indicate corresponding parts in all of the views.

In the drawings, A represents a base or low table having a straight cutter edge $a$. The base or table may advantageously be composed of wood and the part affording the cutter edge may be a plate $a^2$ of steel embedded and secured in the bed. The base has upstanding brackets B B in opposition forwardly of and above the cutting edge $a$ between and supported by which are a pair of horizontal separated and parallel runner bars D D.

E represents a carrier having parallel horizontal holes or bores therethrough and fitted for sliding engagements backward and forward along said runner bars. The said carrier is sectionally made, that is a part thereof is comprised in a hanger F, in the opposite depending members $b$ $b^2$ of which the shaft G for the cutter disk J is journaled. The hanger F has an adjustable rocking connection with the carrier proper, so that the hanger may be positioned, and retained, in a variably inclined position. The carrier proper E has a depending lug $d$ overhanging and slightly separated from the rear face of the hanger. The top of the hanger is held to the carrier proper by the vertically applied screw $f$.

Through the lug $d$ are set screws $e$, shown in Figs. 1 and 3 which have crowding engagement against the hanger so that the latter may be slightly tilted to carry the shaft G, journaled through the hanger, and axially at right angles to the base edge $a$, at a slight forward and downward inclination so that the cutter disk will have its rotation in a plane which is correspondingly slightly upwardly and forwardly inclined for preventing the photo print or other paper or sheet material while being cut from partaking of a folded condition between the face of the cutter disk and the base edge as frequently occurs in the operation of dull or improperly adjusted members of shears. It is to be understood that in the crowding action imparted by the screws $e$, the hanger F is slightly deflected on the extremity of the connecting screw $f$.

The shaft G journaled through the depending hanger members $b$, $B^2$, is slightly movable endwise through said members and it is forced forwardly by the spring $g$ in compression in a hollow hub $b^3$ of the member $b^2$, between a head $h$ of the regulating screw $h^2$ and the end of the shaft, said screw having a thread engagement through the inclosed end of the hub.

The disk carrying shaft G between the hangers has a pulley $i$ affixed thereon, around which a cord or like flexible piece $j$ has an encircling engagement, one end of the cord being affixed to one of the brackets while the other end of the cord is affixed to a stretched spring $k$ affixed to the other bracket. This spring is operative to maintain the cord always under tension and with the pulley encircling intermediate portion thereof comparatively tight around the pulley; and all so that when the carrier E is moved backwardly and forwardly on the parallel runner bars D D, by manual action through the knob or handle $m$ with which the carrier is provided, the pulley shaft and cutter disk will be rotated with extreme rapidity for the cutting action. The cutter disk being diametrically greater than the pulley, it has a greater edge speed than the peripheral speed of the pulley for correspondingly improved slitting action.

Along one end of the table or base, at right angles to the cutter edge $a$ is a stationary gage bar L; and adjacent to and outside of same, parallel therewith, is a bar M slidable through a horizontal guideway $n$ therefor which carries at its forward end a stop gage $M^2$ which extends parallel with the cutting edge. The aforementioned stationary gage stop L may have graduations in units of measurement, such as inches and sub-divisions thereof; and the movable gage-stop-carrying-bar M may be confined in any adjusted position by the set screw $o$. By setting the adjustable gage stop $M^2$ forwardly, at any predetermined distance from the cutting edge, portions of the sheet material of any required dimension may be cut off from the portion held on the base with precision and in a convenient manner.

O represents a clamp normally elevated above the top surface of the base as shown in Fig. 3. This clamp is comprised as a part of or carried by a bail shaped member, the opposite parallel arms $o$ $o$ of which have end eyes $o^2$, which have encircling engagements with the rearward one of the runner bars D, and so that the clamp may have a swinging motion down toward, and upwardly retiring from, the top of the base.

Springs $t$ are provided for normally maintaining the clamp more or less above the upper surface of the base, and as here particularly shown, these are made of spring wire comprising coils formed by the intermediate portions of the wire encircling the bar and having extensions, one $t^2$ of which having an engagement with or anchorage in, the adjacent end bracket while the other, $t^3$ which is made of hook form, has an engagement, for the exertion of an elevating force, against the arm of the bail in proximity thereto. Encircling the forward one of the runner bars, positioned against the brackets, are tubular sections of rubber, $u$, to act as buffers so that if the cutter disk carrier is driven unduly hard and far backward or forward, shock which might result therefrom will be prevented. The holes $v$ made in parallelism through the carrier E are somewhat larger than the diameters of the runner bars D D; and they receive therein tubular fiber anti-friction bushings which greatly increase the running efficiency of the carrier and preclude the necessity of lubrication. Similar bushings $v^2$ are provided in the hanger for the cutter disk shaft G, as represented in Fig. 2.

Changes of minor character and in respect to details of construction may, within the purview of the claims, be made without departing from this invention or sacrificing any of the advantages thereof.

We claim:—

1. In a paper trimmer, a base having a straight cutting edge, and having a horizontal runner support, above and forwardly of the cutting edge, a carrier slidably mounted on said support, and provided with a hanger, having a rocking connection with the carrier,—adjustable means for imparting a variably inclined position to the hanger and retaining it therein, an approximately horizontal, transverse, shaft rotatively mounted in the hanger provided with a cutter disk adapted under the positioning of the hanger to be arranged at a slight upward and forward inclination to the top surface of the base, for coaction with the straight edge of the latter, and means operative under the bodily movement of the carrier for imparting rotation to the disk-carrying shaft.

2. In a paper trimmer, a base, having a straight cutting edge, and having brackets upstanding above the base and in opposition forwardly of the cutting edge, a pair of parallel separated horizontal runner bars extending between and supported by said brackets, a carrier slidably engaged with both said runner bars and having a substantially horizontal shaft rotatively mounted therein, provided with a cutter disk arranged for coaction with the straight edge of said base and having a pulley affixed thereon, and a flexible connection extending between and connected with said brackets, comprising a tensioning spring and having a rotating engagement with the said pulley, and operative under the bodily movement of the latter with the carrier to impart a rotation to the disk-carrying shaft.

3. In a paper trimmer, a base having a straight cutting edge and having at its opposite ends, brackets upstanding above the base and in opposition forwardly of the cutting edge, a runner support extending between and supported by said brackets, a carrier slidably mounted on said runner bars and made at its rear side with depending lugs, a hanger bracket under the carrier, a screw connecting the hanger and carrier, screws engaged through the said hanger lugs, and for exerting a lateral thrust against the hanger, a shaft mounted in said hanger and carrying a cutter disk arranged for coaction with the straight edge of said base, and a pulley fixed on said shaft, and means operative under the bodily movement of the carrier for imparting rotation to the disk carrying shaft.

4. In a paper trimmer, a base having a straight cutting edge, a horizontal support above and parallel with said straight edge, a carrier slidably mounted on said support, and having a shaft extending transverse to the base-edge, rotatively mounted therein, inclined slightly downwardly and forwardly and provided with a cutter disk rotative in a plane at right angles to the shaft axis, coöperative with said base-edge and axially movable relatively to the support, a spring for exerting a yielding force against the shaft in a direction toward the base edge, and means operative under the bodily movement of the carrier for imparting a rotation to the disk-carrying shaft.

5. In a paper trimmer, a base having a straight cutting edge having brackets upstanding above the base, in opposition, forwardly of said cutting edge, a pair of parallel separated horizontal runner bars extending between said brackets, a carrier slidably mounted on said runner bars having a shaft extending transversely relatively to the base edge, rotatively mounted therein, and provided with a cutter disk coöperative with the base edge, a clamp comprised in a bail shaped member having end eyes which have encircling engagements with one of said runner bars, said clamp being coöperative with said base, springs comprising coils encircling the runner bar and extensions of said coils, one of each engaging the upstanding brackets and the other engaging under the arms of the clamp bail, and means, operative under the bodily movement of the carrier, for imparting a rotation to the disk carrying shaft.

6. In a paper trimmer, a base having a straight cutting edge and having brackets upstanding above the base in opposition forwardly of the cutting edge, a pair of parallel separated horizontal runner bars extending between and supported by said brackets, tubular resilient buffers on one of the runner bars next to the brackets, a carrier slidably engaged with both said runner bars and having an axial horizontal shaft rotatively mounted therein, provided with a cutter disk arranged for coaction with the straight edge of said base and having a pulley affixed thereon, and means operative under the bodily movement of the carrier for imparting rotation to the shaft.

Signed by us at Brandon, Vermont in presence of two subscribing witnesses.

WM. H. JOHNSON.
   ARTHUR L. BIRD.
   CHAS. E. CONNELL.

Witnesses:
 FRANK W. WILLIAMS,
 W. R. WHEELER.

Copies of this patent may be obtained for five cents each, by addressing the "Commissioner of Patents, Washington, D. C."